(12) United States Patent
Luo

(10) Patent No.: US 11,528,055 B2
(45) Date of Patent: Dec. 13, 2022

(54) METHOD FOR GENERATING LOW-FREQUENCY POWER CARRIER CONTROL SIGNAL

(71) Applicant: Wuning Luo, Guangxi (CN)

(72) Inventor: Wuning Luo, Guangxi (CN)

(*) Notice: Subject to any disclaimer, the term of this patent is extended or adjusted under 35 U.S.C. 154(b) by 344 days.

(21) Appl. No.: 16/861,351

(22) Filed: Apr. 29, 2020

(65) Prior Publication Data
US 2020/0259524 A1   Aug. 13, 2020

Related U.S. Application Data

(63) Continuation of application No. PCT/CN2017/108472, filed on Oct. 31, 2017.

(51) Int. Cl.
H04B 3/54 (2006.01)
H02J 3/00 (2006.01)
H04L 23/00 (2006.01)

(52) U.S. Cl.
CPC ............... *H04B 3/542* (2013.01); *H02J 3/00* (2013.01); *H04L 23/00* (2013.01); *H04B 2203/5412* (2013.01); *H04B 2203/5416* (2013.01)

(58) Field of Classification Search
CPC ........... H04B 3/54; B60W 10/08; B60L 15/20
See application file for complete search history.

(56) References Cited

U.S. PATENT DOCUMENTS

5,084,658 A * 1/1992 Nielsen ............... B60L 50/52
                                                          318/599
2012/0068824 A1   3/2012 Steiner et al.

FOREIGN PATENT DOCUMENTS

| CN | 101646296 A | 2/2010 |
| CN | 104582143 A | 4/2015 |
| CN | 206181456 U | 5/2017 |
| JP | 2010283980 A | 12/2010 |

* cited by examiner

*Primary Examiner* — Kevin Kim

(57) ABSTRACT

The present invention discloses a method for generating a low-frequency power carrier control signal. An alternating current power supply voltage/current of a target control device is enabled to experience a specified small jump within n T periods; a jump state in each period is respectively represented by one binary code; different combinations of the jump states in the n T periods and different combinations of formed n binary codes are preset to correspond to different control instructions in a system. After the target control device monitors the voltage/current jump, on the basis of a preset corresponding rule between the n binary codes as well as the jump state codes and the control instructions, control can be implemented according to a corresponding control instruction.

8 Claims, 5 Drawing Sheets

METHOD FOR GENERATING LOW-FREQUENCY POWER CARRIER CONTROL SIGNAL

CROSS-REFERENCE TO RELATED APPLICATIONS

This application is a continuation of International Application No. PCT/CN2017/108472 with a filling date of Oct. 31, 2017, designating the United states, now pending. The content of the aforementioned application, including any intervening amendments thereto, is incorporated herein by reference in its entirety.

TECHNICAL FIELD

The present invention relates to the field of electrical control, and more particularly relates to a method for generating a low-frequency power carrier control signal.

BACKGROUND OF THE PRESENT INVENTION

With the development of computers, the power electronics technology and the automatic control technology, the electrical control technology is gradually developed towards intelligentization and networking. Meanwhile, safety performance, working reliability, cost performance and anti-interference performance are still the focus of technical developers in this field.

SUMMARY OF THE PRESENT INVENTION

The purpose of the present invention is to provide a method for generating a low-frequency power carrier control signal, which conveniently realizes intelligent network control and has good working reliability, cost performance and anti-interference performance.

The method for generating a low-frequency power carrier control signal in the present invention comprises the following contents: an alternating current power supply voltage/current of a target control device is enabled to experience a specified small jump within n T periods; a jump state in each period is respectively represented by one binary code (for example: a positive jump code is "1", and a negative jump code is "0"; or vice versa); the code is the same as the previous period when no jump exists in one period T, wherein n is a natural number from 2 to 5000 and a time interval between two jumps is greater than or equal to T; and different combinations of voltage/current of the jump states in the n T periods and different combinations of formed n binary codes of the jump states are preset to correspond to different control instructions in a system.

In the method for generating the low-frequency power carrier control signal in the present invention, a power supply line of the target control device is used to generate and transmit a control instruction. Before use, it is only necessary to set the corresponding relationship of different jump states in n T periods and different n binary codes of the jump states with the same/different control instructions of the same/different devices in advance on a control end and a device side. During use, the control end controls the corresponding alternating current power supply voltage/current to experience a small jump in n T periods according to the instruction content; and after the target control device monitors the voltage/current jump, the target control device can identify the control instruction according to the preset corresponding relationship between the n binary codes of the jump states and the control instruction, so as to realize the corresponding control.

In the method of the present invention, the specific solution for controlling the alternating current power supply voltage/current to experience a small jump can be selected by those skilled in the art according to the actual use site in combination with technical knowledge. The jump amplitude can also be determined according to different electrical environments and different application requirements, and it is appropriate not to affect the normal operation and life of the electric equipment. Generally, voltage rise/fall of 0.5-30V can be selected (of course, if allowed by the equipment performance and the use environments, the voltage jump can be designed to a larger range). From the perspective of convenience for detection, the jump amplitude is often set to be greater than or equal to voltage/current rating×0.5%. Each voltage jump can be a positive voltage jump or a negative voltage jump according to the common knowledge of those skilled in the art; and each current jump can be a positive current jump or a negative current jump.

Since the monitoring accuracy of the voltage/current jump in the prior art can reach a millisecond level, the T can be preferably set to 5 ms to 20 s according to different application occasions. If T=20 ms and n=7, $2^7$ (128) types of 7-bit code combinations of the jump states can be formed within the time of n×T=140 ms, and can correspond to 128 different control instructions of the same type or different types. If the solution is applied to speed regulation control, it indicates that more than one hundred levels of speed regulation instructions can be sent in just 140 ms, which obviously means that the solution is equivalent to continuous and stepless level regulation control for a function of the device. The solution can also be used to control different functions of different electrical loads, e.g., cluster control for different functions of multiple devices such as air conditioning (including on/off, cooling, heating, dehumidification, wind direction, wind speed, etc.), light, sound, televisions, ventilation and monitoring.

As a further optimization of the above technical solution, in order to increase the control anti-interference performance, expand the scope of application and increase the control efficiency, one or more bits of the n binary codes of the jump states can be preset in the system to serve as a criterion for formal transmission of the control signal; and/or different combinations of more bits of the preset n binary codes of the jump states are set in the system to correspond to different types of electrical load, and/or different electrical equipment, and/or represent different control functions. In the solution, the positions of more bits of the binary codes of the jump states used as the criterion for formal transmission of the control signal and corresponding to different types of electrical load, different electrical equipment and different control functions in the n binary codes of the jump states may be connected or disconnected.

In the method of the present invention, the control for the alternating current power supply voltage/current to experience a small jump can be realized manually or by other auxiliary circuits or devices locally at the target control device or at the remote end of the power supply line. The following are preferred circuits and control rules:

1. Solution I

Circuit part: a secondary winding of a first transformer is connected in series on an alternating current power supply main loop of the target control device; an I branch formed mainly by a primary winding of the first transformer and an electrical element M or/and a first switch is connected in parallel to two poles of an alternating current power supply of the target control device; a second switch is connected in parallel to both ends of the primary winding of the first transformer or both ends of the electrical element M to form a II loop; the electrical element M may be a power frequency reactor or a transformer (hereinafter defined as "a second transformer") or a resistor; when the electrical element M is the second transformer, the primary winding of the first transformer is connected in series with the primary winding of the second transformer, while the secondary winding of the second transformer is kept open or connected to a light load; and when the second switch is connected in parallel to both ends of the second transformer, the second switch is connected in parallel to both ends of the primary winding of the second transformer.

The control rule comprises the following content: when the system is in a power-on initial state and the target control device is operated in a steady state, the second switch is open/closed; and when a control signal is required to be sent to the target control device, the second switch or the first switch is turned on/off to generate a corresponding voltage/current jump according to the preset control instruction and the corresponding rule of the n binary codes of the jump states.

When such a solution is adopted that the second switch is connected in parallel to both ends of the primary winding of the first transformer, and the first switch is connected in series in the I branch, the second switch is closed when the system is in the power-on initial state and the target control device is operated in the steady state; and when the control signal is required to be sent to the target control device, the first switch is closed at first, and then the second switch is turned on/off to generate a corresponding voltage/current jump according to the preset control instruction and the corresponding rule of the n binary codes of the jump states; and after the control signal is sent, the first switch is turned off.

The switches in the solution can be electromechanical switches, solid state relays, bidirectional thyristors, or two anti-parallel unidirectional thyristors, or two anti-parallel unidirectional power electronic switches and other electrical elements. The parameter selection of the first transformer and the power frequency reactor/second transformer/resistor can be determined by those skilled in the art according to the content requirements of the above technical solutions and in combination with specific actual applications. Obviously, with the on/off of the second switch or the first switch, it is appropriate to generate small voltage/current jump, on the alternating current power supply main loop of the target control device, which is convenient for detection and identification without affecting the normal operation and life of the device on the power supply main loop.

2. Solution II

Circuit part: a secondary winding of a first transformer is connected in series on an alternating current power supply main loop of the target control device; an I branch formed mainly by a primary winding of the first transformer and a first switch is connected in parallel to two poles of an alternating current power supply of the target control device; a second switch is connected in parallel to both ends of the primary winding of the first transformer to form a II loop; the first switch and the second switch are electrically interlocked.

The control rule comprises the following content: when the system is in a power-on initial state and the target control device is operated in a steady state, the second switch is open/closed; and when a control signal is required to be sent to the target control device, the second switch is turned on/off to generate a corresponding voltage/current jump according to the preset control instruction and the corresponding rule of the n binary codes of the jump states.

3. Solution III

Circuit part: the second switch is connected in series on an alternating current power supply main loop of the target control device; the second switch is connected with a power input end of the target control device at a point A; taps on both ends of an autotransformer are respectively connected to two poles of the alternating current power supply of the target control device; a middle tap of the autotransformer is connected to the point A through the first switch; the first switch and the second switch are electrically interlocked;

The control rule comprises the following content: when the system is in a power-on initial state and the target control device is operated in a steady state, the second switch is open/closed; and when a control signal is required to be sent to the target control device, the second switch is turned on/off to generate a corresponding voltage/current jump according to the preset control instruction and the corresponding rule of the n binary codes of the jump states.

The method for generating the low-frequency power carrier control signal in the present invention has the following advantages:

1. The control instructions are generated and sent to the target control device through low-frequency power lines; construction and operation management costs are extremely low; and remote control is extremely easy to realize.

2. It is easy to realize group control and multi-level, multifunctional, and fine intelligent network control of different devices in a short time. Moreover, the present invention has good safety, working reliability and cost performance, has excellent anti-interference performance, and thus is suitable for being popularized and applied in various control fields.

DETAILED DESCRIPTION

The method for generating the low-frequency power carrier control signal in the present invention is further described below in combination with the drawings and embodiments.

I. Embodiment 1 of the Method for Generating the Low-Frequency Power Carrier Control Signal in the Present Invention An alternating current power supply voltage of a target control device is enabled to experience one or more positive jumps with amplitude of 0.5V within four T periods (T=2 s); a time interval between two adjacent jumps is greater than or equal to 2 s; and different combinations of the jump states within four T periods are preset to correspond to different control instructions in a system. A jump state in each period is respectively represented by one binary code; a positive jump code is "1" and a negative jump code is "0"; the code is the same as the previous period when no jump exists in one period T; and there are 16 combinations of the jump states within 8 s.

Figure 1:
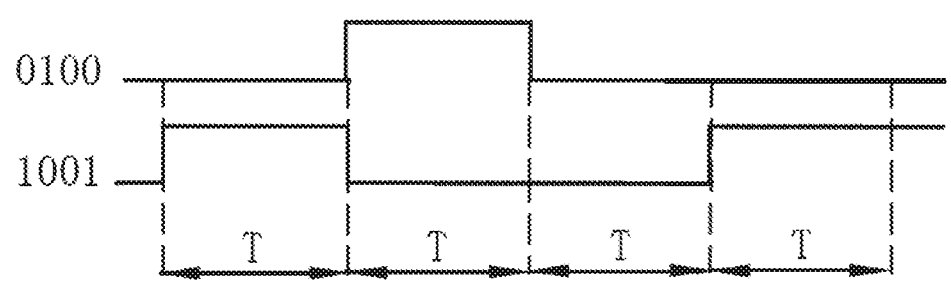
FIG. 1 is a control signal waveform legend of an embodiment of a method for generating a low-frequency power carrier control signal in the present invention.

Application example: the embodiment is used for motor speed regulation and correspondingly sets 16 combinations of the jump states within four T periods (T=2 s) to 16-level speed regulation instructions; the binary jump state code "0100" corresponds to the instruction of motor speed regulation to 4th level; "1001" corresponds to the instruction of speed regulation to 9th level; and the corresponding voltage jump waveform graph is shown in FIG. 1.

II. Embodiment 2 of the Method for Generating the Low-Frequency Power Carrier Control Signal in the Present Invention An alternating current power supply voltage of a target control device is enabled to experience one or more positive jumps with amplitude of 5V within six T periods (T=20 ms); a time interval between two adjacent jumps is greater than or equal to 20 ms; and different combinations of the jump states within six T periods are preset to correspond to different control instructions in a system. A jump state in each period is respectively represented by one binary code; a positive jump code is "1" and a negative jump code is "0"; the code is the same as the previous period when no jump exists in one period T; and there are 64 combinations of the jump states within 120 ms.

Figure 2:
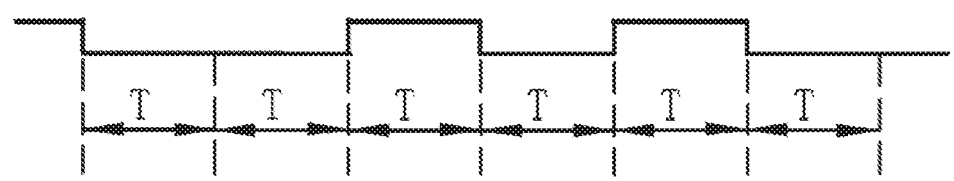
FIG. 2 is a control signal waveform legend of another embodiment of a method for generating a low-frequency power carrier control signal in the present invention.

Application: for example, the embodiment can be used for multi-level adjustment of different control functions of air conditioners, such as temperature, wind speed, wind direction, and the like. For example, different combinations of the first two bits in the preset 6-bit binary codes of the jump states correspond to different control functions (00 is cooling, 01 is heating, 10 is wind speed and 11 is wind direction); different combinations of three middle bits correspond to different control levels (8 levels in total); and the last bit (preset as 0 to indicate that the signal is correct) is used as the criterion for the formal transmission of the control signal. The binary code of the voltage jump waveform graph shown in FIG. 2 is 001010, which can represent a temperature drop of 5° C.

Of course, different combinations of the first bit and the last bit can also be set to correspond to different control functions, and different combinations of the middle four bits correspond to different control levels (16 levels in total).

III. Embodiment 3 of the Method for Generating the Low-Frequency Power Carrier Control Signal in the Present Invention An alternating current power supply voltage of a target control device is enabled to experience one or more negative jumps with amplitude of 2V within thirty-two T periods (T=10 ms); a time interval between two adjacent jumps is greater than or equal to 10 ms; and different combinations of the jump states within thirty-two T periods are preset to correspond to different control instructions in a system. A jump state in each period is respectively represented by one binary code; a positive jump code is "1" and a negative jump code is "0"; and the code is the same as the previous period when no jump exists in one period T. The 32-bit binary codes of the jump states are divided into 4 bytes, with 8 bits per byte, wherein each byte is set in the system to correspond to different types of electrical loads and different electrical equipment, represent different control functions and serve as check codes for signal transmission. Thus, the jump states of 8 bits per byte within eight T periods can have 256 different combinations at most, and corresponding relationships with 256 different control instructions are preset in the system.

Obviously, the solution can be independently set according to the actual use site conveniently and realize intelligent multi-level, multifunctional and fine network control of multiple different electrical loads and the electrical functions. Moreover, the working reliability, cost performance and anti-interference performance are excellent.

Figure 3:
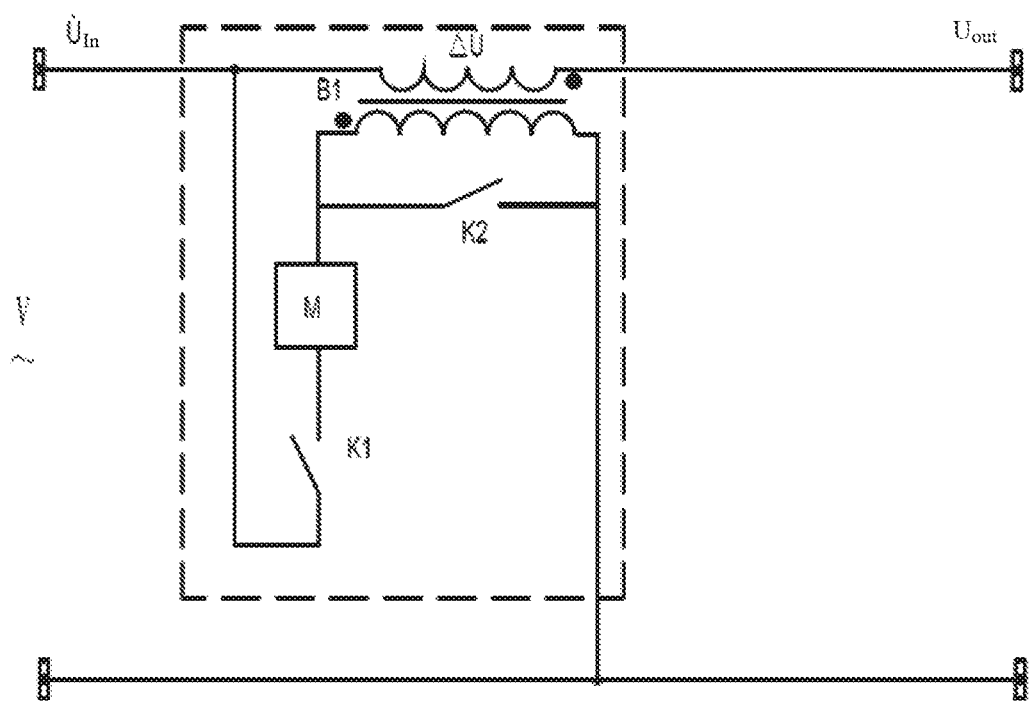
FIGS. 3-10 are schematic circuit diagrams of embodiments of generating multiple low-frequency power carrier control signals in the method and application of the present invention.
Figure 4:
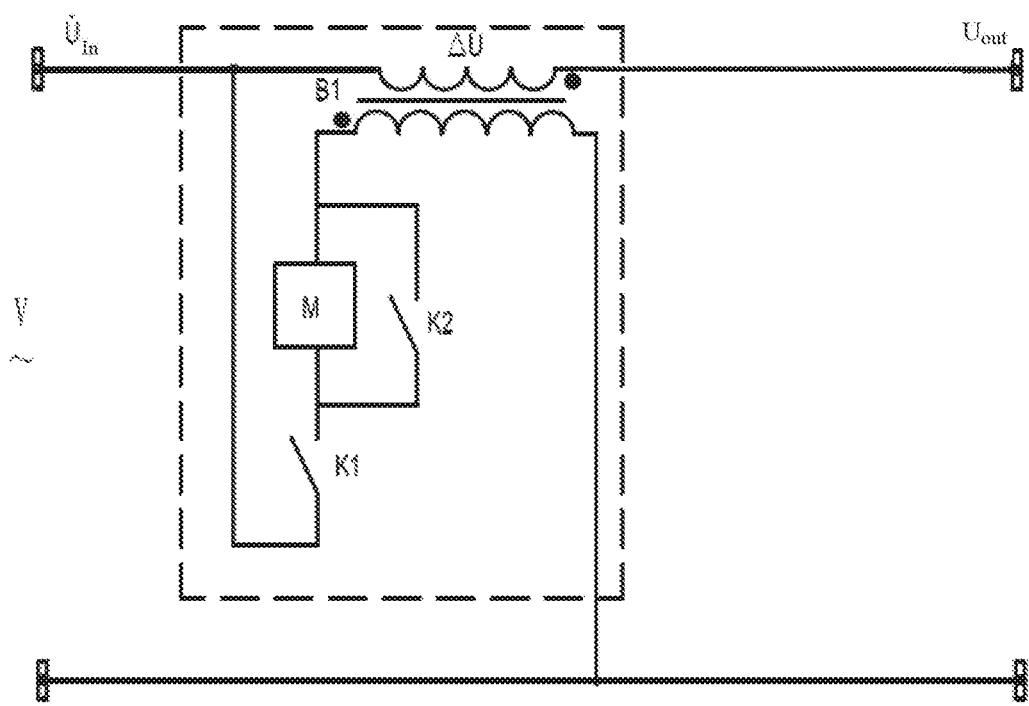
Figure 5:
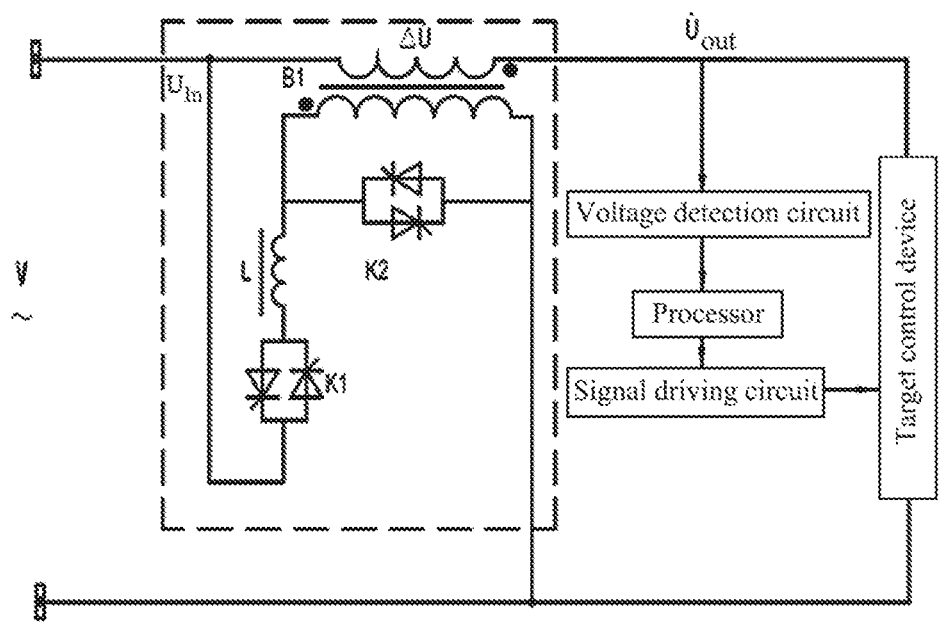
Figure 6:
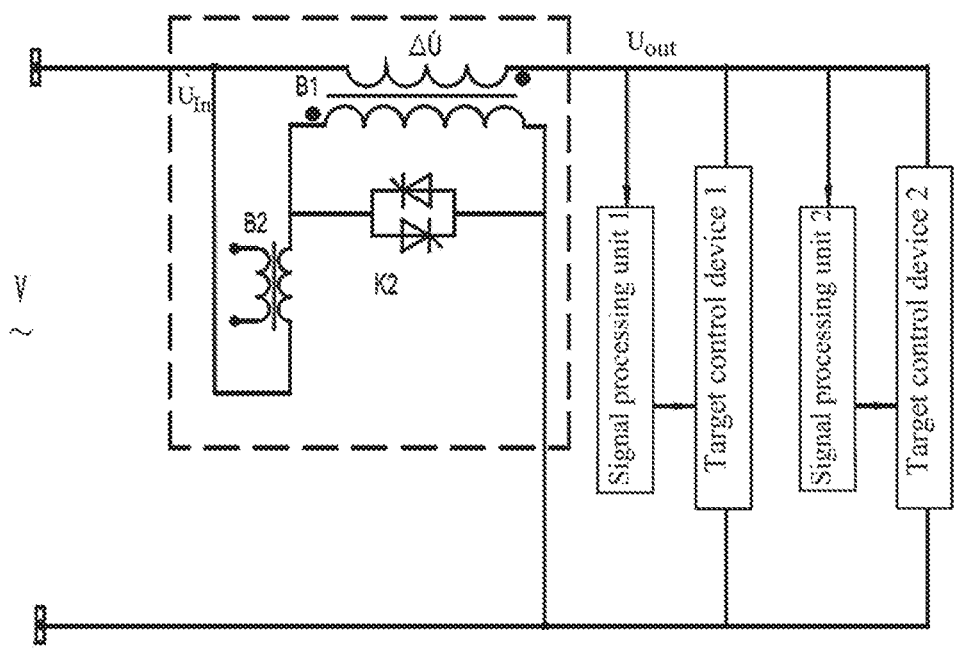
Figure 7:
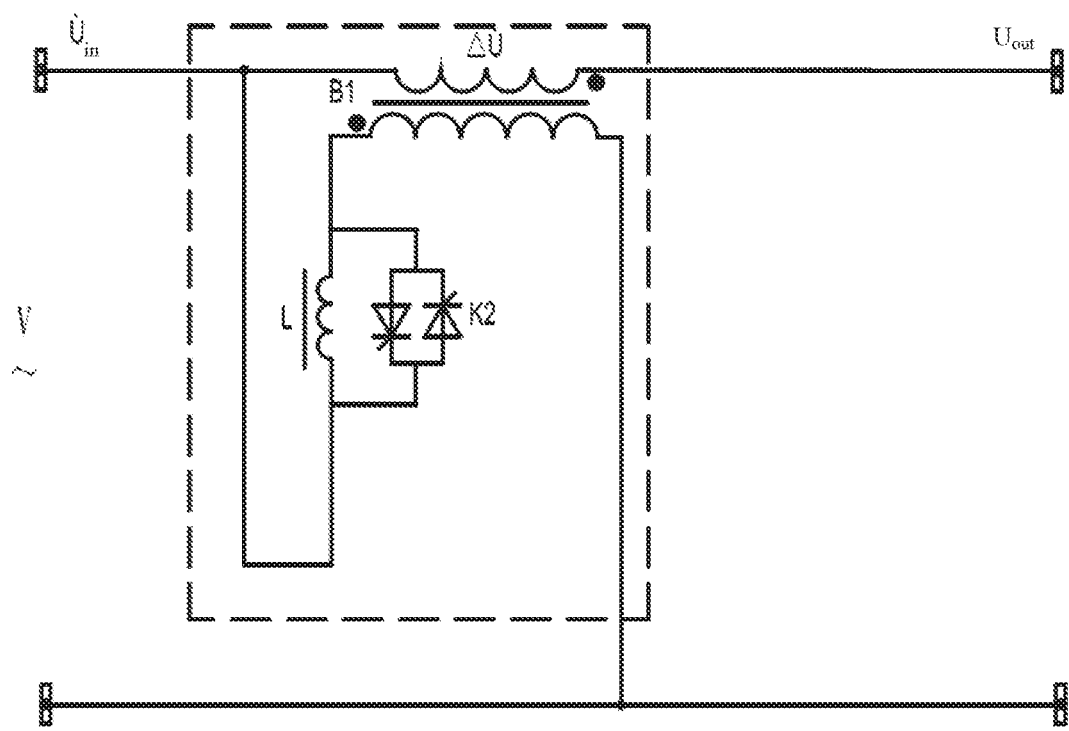
Figure 8:
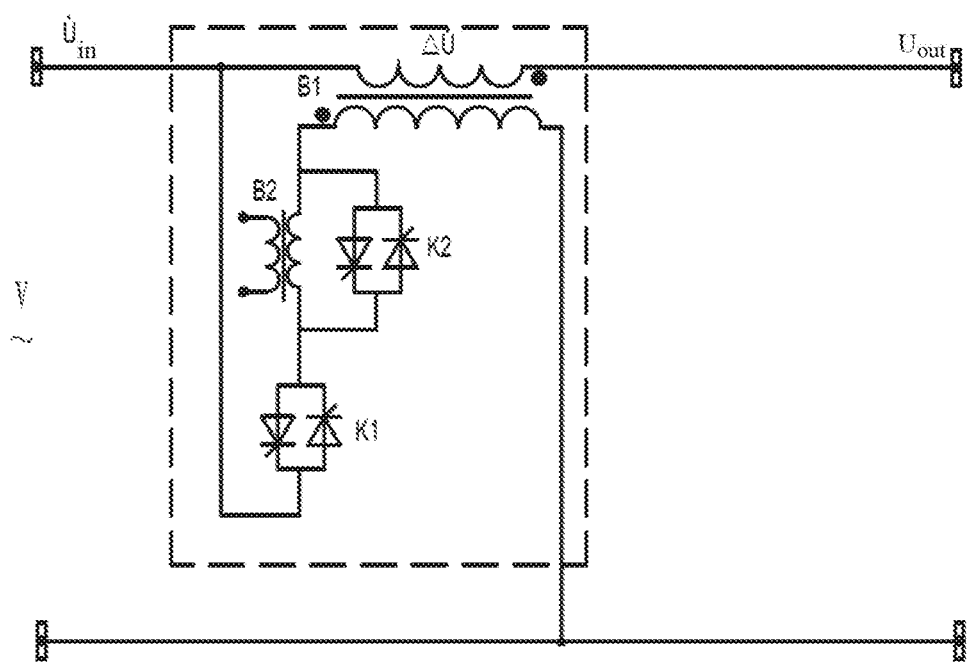

IV. Embodiment 4 of the Method for Generating the Low-Frequency Power Carrier Control Signal in the Present Invention The control for the alternating current power supply voltage/current to experience a small jump in the method of the present invention can be realized by the following circuit and control rule:

Hardware part: as shown in dashed boxes in FIGS. 3-8, a secondary winding of a first transformer B1 is connected in series on an alternating current power supply main loop of a target control device; an I branch formed mainly by a primary winding of the first transformer B1 and an electrical element M or/and a first switch K1 is connected in parallel to two poles of an alternating current power supply of the target control device; a second switch K2 is connected in parallel to both ends of the primary winding of the first transformer B1 (as shown in FIGS. 3, 5 and 6) or connected in parallel to both ends of the electrical element M (as shown in FIG. 4) to form a II loop. The electrical element M may be a power frequency reactor L as shown in FIGS. 5 and 7 or a transformer B2 as shown in FIGS. 6 and 8 (hereinafter defined as "a second transformer") or a resistor for substitute. When the electrical element M is the second transformer B2 as shown in FIGS. 6 and 8, the primary winding of the first transformer B1 is connected in series with the primary winding of the second transformer B2, while the secondary winding of the second transformer B2 is kept open or connected to a light load (e.g., connected to an indicator lamp or resistor, etc.); and when the second switch K2 is connected in parallel to both ends of the second transformer B2, it means that the second switch K2 is connected in parallel to both ends of the primary winding of the second transformer B2, as shown in FIG. 8. The switches can be electromechanical switches, solid state relays, bidirectional thyristors, or two anti-parallel unidirectional thyristors, or two anti-parallel unidirectional power electronic switches and other switch devices.

At this time, the following listed control rule is preferably used together: when the system is in a power-on initial state and the target control device is operated in a steady state, the second switch K2 is kept closed; and when a control signal is required to be sent to the target control device, the second switch K2 or the first switch is turned on/off to generate a desired voltage/current jump according to the preset control instruction and the corresponding rule of the n binary codes of the jump states.

The above described preferred control signal generation rule requires that the second switch K2 is kept closed when the system is in the power-on initial state and the target control device is operated in the steady state. According to the common knowledge of those skilled in the art, as long as the voltage ΔU on both ends of the secondary winding of the first transformer B1 is designed to be within the acceptable range of the target control device, it is also feasible that the second switch K2 is kept open when the system is in the power-on initial state and the target control device is operated in the steady state.

FIGS. 5 and 6 are two application example diagrams of the method for generating the low-frequency power carrier control signal in the present invention: the present invention can be applied to a conventional target control device and add online, remote and cluster control functions for the conventional target control device, as long as a corresponding signal processing unit (mainly including a voltage/current detection circuit, a signal processing circuit and a driving circuit) is configured and the corresponding relationships between the voltage/current jump states and the control instructions are set. In use, after the target control device monitors the voltage/current jump through the voltage/current detection circuit, the signal processing circuit recognizes a specific control instruction according to the preset corresponding relationships, so that the driving circuit drives a corresponding control terminal of the target control device to realize the corresponding control.

V. Embodiment 5 of the Method for Generating the Low-Frequency Power Carrier Control Signal in the Present Invention The present embodiment is applicable to the solution in the previous embodiment that the second switch K2 is connected in parallel to both ends of the primary winding of the first transformer B1 and the first switch K1 is connected in series in the I branch (as shown in FIG. 5). The present embodiment can adopt the following listed specific control signal generation rule: the second switch K2 is kept closed when the system is in the power-on initial state and the target control device is operated in the steady state, so that both ends of the primary winding of the first transformer are short-circuited; and when the control signal is required to be sent to the target control device, the first switch K1 is closed at first, and then the second switch is turned on/off to generate a corresponding voltage/current jump according to the preset control instruction and the corresponding rule of the n binary codes of the jump states; and after the control signal is sent, the first switch K1 is turned off.

Figure 9:
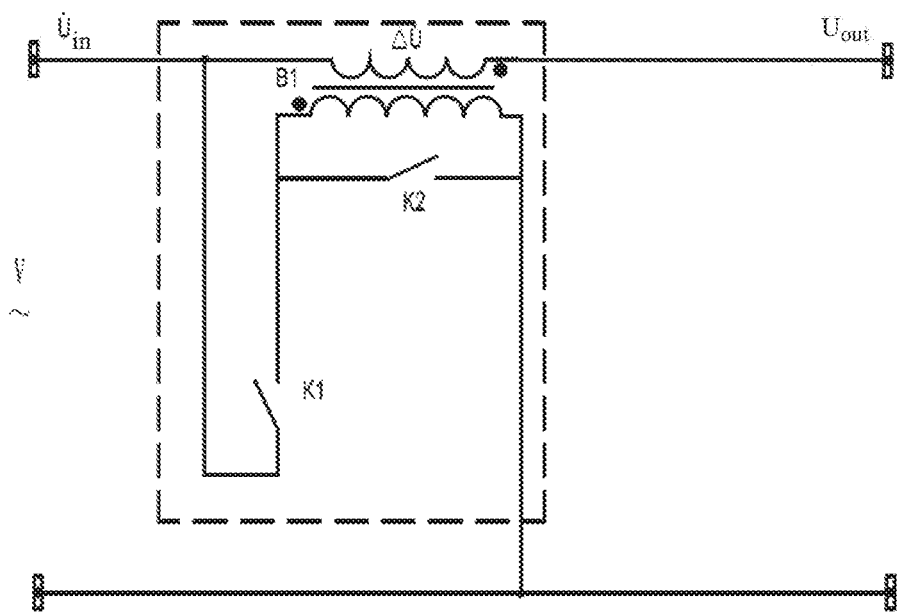

VI. Embodiment 6 of the Method for Generating the Low-Frequency Power Carrier Control Signal in the Present Invention The control for the alternating current power supply voltage/current to experience a small jump in the method of the present invention can also be realized by the following circuit and control rule:

Hardware part: as shown in the dashed box in FIG. 9, a secondary winding of a first transformer B1 is connected in series on an alternating current power supply main loop of the target control device; an I branch formed mainly by a primary winding of the first transformer B1 and a first switch K1 is connected in parallel to two poles of an alternating current power supply of the target control device; a second switch K2 is connected in parallel to both ends of the primary winding of the first transformer B1 to form a II loop; and the first switch K1 and the second switch K2 are electrically interlocked (i.e., the first switch and the second switch shall not be closed or opened at the same time).

The control rule comprises the following content: when the system is in a power-on initial state and the target control device is operated in a steady state, the second switch K2 is closed (and of course, can also be open); and when a control signal is required to be sent to the target control device, the second switch K2 is turned on/off to generate a corresponding voltage/current jump according to the preset control instruction and the corresponding rule of the n binary codes of the jump states.

Figure 10:
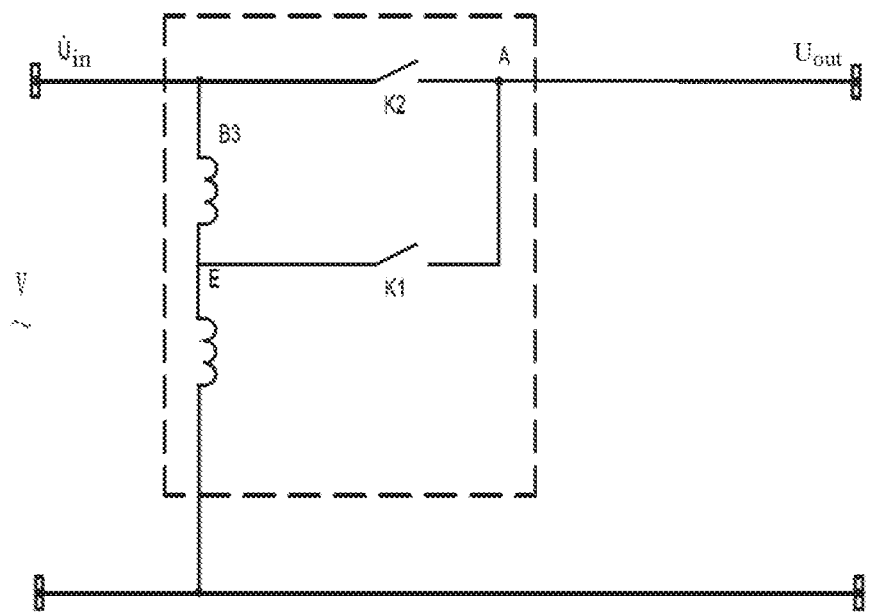

VII. Embodiment 7 of the Method for Generating the Low-Frequency Power Carrier Control Signal in the Present Invention The control for the alternating current power supply voltage/current to experience a small jump in the method of the present invention can also be realized by the following circuit and control rule:

Circuit part: as shown in the dashed box in FIG. 10, the second switch K2 is connected in series on an alternating current power supply main loop of the target control device; the second switch K2 is connected with a power input end of the target control device at a point A; taps on both ends of an autotransformer B3 are respectively connected to two poles of the alternating current power supply of the target control device; a middle tap E of the autotransformer B3 is connected to the point A through the first switch K1; and the first switch K1 and the second switch K2 are electrically interlocked.

The control rule comprises the following content: when the system is in a power-on initial state and the target control device is operated in a steady state, the second switch K2 is kept closed (and of course, can also be open); and when a control signal is required to be sent to the target control device, the second switch K2 is turned on/off to generate a corresponding voltage/current jump according to the preset control instruction and the corresponding rule of the n binary codes of the jump states.

The above contents are only some illustrated preferred embodiments of the present invention, and shall not be intended to limit the implementation of the present invention. All equivalent changes and improvements made by those skilled in the art according to the technical solutions of the present invention shall belong to the scope of the technical solutions of the present invention.

INDUSTRIAL APPLICABILITY

Those skilled in the art can easily know from the above description that the technical solutions of the present invention are suitable for manufacturing in industry and use in production and life. Therefore, the present invention has industrial applicability.

What is claimed is:
1. A method for generating a low-frequency power carrier control signal, the method comprising:
enabling an alternating current power supply voltage/current of a target control device to experience a specified small jump within n T periods, wherein a jump state in each period is respectively represented by one binary code; the code is the same as the previous period when no jump exists in one period T, and n is a natural number from 2 to 5000 and a time interval between two jumps is greater than or equal to T; and
presetting different combinations of voltage/current of the jump states in the n T periods and different combinations of formed n binary codes of the jump states to correspond to different control instructions in a system;

wherein one or more bits of the n binary codes of the jump states preset in the system are used as a criterion for formal transmission of the control signal; and/or different combinations of more bits of the preset n binary codes of the jump states are set in the system to correspond to different types of electrical load, and/or different electrical equipment, and/or represent different control functions.

2. The method for generating the low-frequency power carrier control signal according to claim 1, wherein the positions of more bits of the binary codes of the jump states used as the criterion for formal transmission of the control signal and corresponding to different types of electrical load, different electrical equipment and different control functions in the n binary codes of the jump states are connected or disconnected.

3. The method for generating the low-frequency power carrier control signal according to claim 1, wherein the T is from 5 ms to 20 s.

4. The method for generating the low-frequency power carrier control signal according to claim 1, wherein each voltage jump is a positive voltage jump or a negative voltage jump; and each current jump is a positive current jump or a negative current jump.

5. A method for generating a low-frequency power carrier control signal, the method comprising:

enabling an alternating current power supply voltage/current of a target control device to experience a specified small jump within n T periods, wherein a jump state in each period is respectively represented by one binary code; the code is the same as the previous period when no jump exists in one period T, and n is a natural number from 2 to 5000 and a time interval between two jumps is greater than or equal to T; and presetting different combinations of voltage/current of the jump states in the n T periods and different combinations of formed n binary codes of the jump states to correspond to different control instructions in a system;

wherein the method is performed using the following circuit and control rule:

the circuit: a secondary winding of a first transformer is connected in series on an alternating current power supply main loop of the target control device; an I branch formed mainly by a primary winding of the first transformer and an electrical element M or/and a first switch is connected in parallel to two poles of an alternating current power supply of the target control device; a second switch is connected in parallel to the primary winding of the first transformer or both ends of the electrical element M to form a II loop; the electrical element M is a power frequency reactor or a second transformer or a resistor; when the electrical element M is the second transformer, the primary winding of the first transformer is connected in series with the primary winding of the second transformer, while the secondary winding of the second transformer is kept open or connected to a light load; and when the second switch is connected in parallel to both ends of the second transformer, the second switch is connected in parallel to both ends of the primary winding of the second transformer;

the control rule comprises the following content: when the system is in a power-on initial state and the target control device is operated in a steady state, the second switch is open/closed; and when a control signal is required to be sent to the target control device, the second switch or the first switch is turned on/off to generate a corresponding voltage/current jump according to the preset control instruction and the corresponding rule of the n binary codes of the jump states.

6. The method for generating the low-frequency power carrier control signal according to claim 5, wherein when such a solution is adopted that the second switch is connected in parallel to both ends of the primary winding of the first transformer, and the first switch is connected in series in the I branch, the second switch is closed when the system is in the power-on initial state and the target control device is operated in the steady state; and when the control signal is required to be sent to the target control device, the first switch is closed at first, and then the second switch is turned on/off to generate a corresponding voltage/current jump according to the preset control instruction and the corresponding rule of the n binary codes of the jump states;

after the control signal is sent, the first switch is turned off.

7. The method for generating the low-frequency power carrier control signal according to claim 5, wherein the first switch and the second switch are electrically interlocked.

8. A method for generating a low-frequency power carrier control signal, the method comprising:

enabling an alternating current power supply voltage/current of a target control device to experience a specified small jump within n T periods, wherein a jump state in each period is respectively represented by one binary code; the code is the same as the previous period when no jump exists in one period T, and n is a natural number from 2 to 5000 and a time interval between two jumps is greater than or equal to T; and presetting different combinations of voltage/current of the jump states in the n T periods and different combinations of formed n binary codes of the jump states to correspond to different control instructions in a system;

wherein the method is performed using the following circuit and control rule:

the circuit: the second switch is connected in series on an alternating current power supply main loop of the target control device; the second switch is connected with a power input end of the target control device at a point A; taps on both ends of an autotransformer are respectively connected to two poles of the alternating current power supply of the target control device; a middle tap of the autotransformer is connected to the point A through the first switch; the first switch and the second switch are electrically interlocked;

the control rule comprises the following content: when the system is in a power-on initial state and the target control device is operated in a steady state, the second switch is open/closed; and when a control signal is required to be sent to the target control device, the second switch is turned on/off to generate a corresponding voltage/current jump according to the preset control instruction and the corresponding rule of the n binary codes of the jump states.

* * * * *